United States Patent Office 3,243,318
Patented Mar. 29, 1966

3,243,318
CONTINUOUS COUNTERCURRENT APPARATUS FOR CONTACTING SOLID WITH LIQUID AND ASSOCIATED METHODS
Kazuhiko Mihara, Tokyo, and Takashi Yamashiki, Yokohama, Japan, assignors to Asahi Kasei Kogyo Kabushiki Kaisha, Osaka, Japan, a corporation of Japan
Filed Aug. 22, 1963, Ser. No. 303,790
Claims priority, application Japan, Oct. 26, 1962, 37/46,568
3 Claims. (Cl. 134—25)

This invention relates to a continuous countercurrent apparatus for contacting granular material with liquid so as to effect chemical reactions. When a reaction between granular material and liquid is to be accomplished, it is desirable to mix both materials as uniformly as possible, while bringing them into contact. For this purpose, rectifying apparatus such as perforated plates have been used. It is desired that such perforated plates have many holes and a large effective hole-area to make rectification effective, but the effective hole-area cannot be increased to more than about 50 percent of the surface area of the face of the plate because of difficulty of construction. Moreover, the velocity of the ascending liquid at these parts becomes more than twice as fast as at other parts. In conventional countercurrent apparatus in which rectifying means, such as perforated plates, are provided for the purpose of uniform mixing and the contact between liquid and granular materials, the liquid is allowed to flow upwardly in the apparatus, whereas the granular materials descend therein under gravitational force to contact said liquid, and the velocity of the liquid is always lower than that of the descending granular materials. Accordingly, the countercurrent contact between the liquid and the granular materials in said apparatus requires a fairly large apparatus. There occur drawbacks as described above with a process using a large apparatus, namely, uneven flow and inefficiency in the contact reaction as the size of the apparatus becomes greater.

The inventors have found that uniform mixing and rapid contact of granular material and liquid is achieved by an apparatus which is equipped with rectifying plates providing different passages for falling granular material and ascending liquid.

Figure 1:
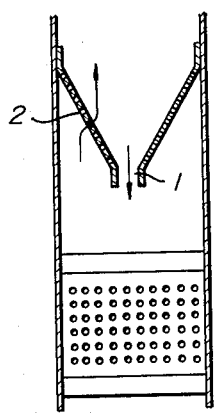
Figure 2:
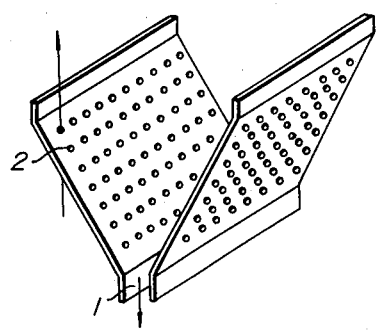
Figure 3:
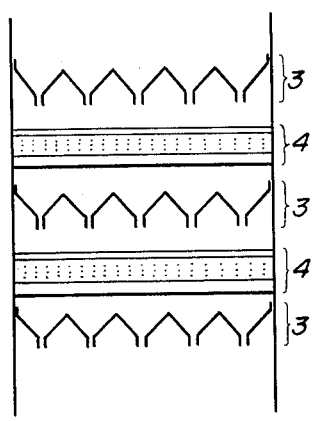

The invention will be explained in detail in conjunction with the accompanying drawings wherein:

FIG. 1 is a vertical cross sectional view of a part of countercurrent apparatus for contacting granular material with liquid equipped with rectifying plates of the present invention, FIG. 2 is a perspective view of two individual rectifying plates, and FIG. 3 is a vertical cross-sectional view of an apparatus of commercial scale.

Two perforated rectifying plates forming a set are shown in FIG. 2. Each plate consists of an inclined perforated portion and a vertical portion (referred to as a foot hereinafter). The plates are horizontally spaced so that two feet face each other with a small continuous space therebetween to define a narrow path 1. The inclined perforated portion has holes 2 which provides passages for the upwardly flowing liquid as indicated by the arrow and said narrow path 1 provides a passage for the granular material flowing downwardly as indicated by the other arrow. The holes 2 are uniformly spaced in the inclined perforated portion and are preferably smaller than the particle size of the granular material to be contacted so that substantially no granular material passes through the holes. Accordingly, the granular material on the inclined perforated plates gradually slides down along the surface of the plate and passes through said narrow path 1. The granular material is mixed with the liquid upwardly passing through said holes and the mixing and contact are carried out more rapidly, uniformly, and effectively than in the conventional case wherein both the liquid and the granular material pass through the same passages or holes.

The inclination of two perforated plates facilitates the movement of granular material toward the central passage. Even a slight inclination makes it possible to carry out the method of this invention, but practically an angle of from about 30° to 70° with respect to the horizontal is suitable. When it is less than 30° the effect of promoting movement of granular material toward the central passage is small, whereas when the inclination is greater than 70° the granular material accumulates in the central passage and impedes mixing with solids. This necessitates increasing the height for each step.

It is necessary to vary the hole diameter of the perforated plates and the width of passage of granular material slightly according to the size and kind of granular material, but the smaller the hole diameter, the greater the safety against leakage. In other words it is possible to make the granular material not leak through the holes of the perforated plates and make only the liquid pass therethrough and contact the granular material.

When the passage of granular material and liquid are separated as stated above, it is possible to increase the velocity of liquid from 2 to 2.5 times as fast as the case when granular material and liquid pass in the same passage in which contact occurs. Furthermore since the perforated plates are inclined, the movement of granular material toward the central passage is facilitated and uneven liquid flow is prevented. There is no fear of slackening because granular material is quickly mixed with ascending liquid.

When the reaction is to be conducted on a commercial scale, a plurality of horizontal rectifying plates are provided in each step and several superposed steps are installed in a tower, the directions of the rectifying plates in each adjoining step being varied, for example, by 90° as indicated in FIG. 3. Thereby, uneven flow of liquid is prevented and uniform contact of granular material and liquid is accomplished. This effect is brought about by the even distribution of the granular materials discharged from the paths 1 onto the perforated plates of the next superposed step below.

In order to show the operation of the apparatus of this invention the following examples are furnished.

*Example 1*

A reaction which regenerates Ca type strong acidic positive ion exchange resin (Diaion SKIA trade name) into Na type by 3.5 N NaCl was performed by this apparatus.

The cross section of the apparatus is a square having an area of 0.09 m.$^2$. The rectifying plates are square and have sides 30 cm. each, an effective hole area of 30 percent, hole diameter 9 mm. The passage for granular material is 4 cm. in width. The distance between each step of rectifying plates is 50 cm. Total tower height is 5 m.

The falling velocity of the ion exchange resin is 600 l./hr. and regeneration is conducted by 1000 l./hr. of 3.5 N NaCl solution. Regeneration results show that from Ca 0.30 meq./R-Na$^{cc.}$ of adsorbed amount of the incoming resin to Ca 0.07 meq./R-Na$^{cc.}$ of the outgoing resin is effected.

An ascending linear velocity of up to 12 m./hr. is possible at a temperature 20° C. The width of the granular material passage is suitable at about 2-6 cm. and the hole diameter is suitable at less than 9 mm. On the other hand, in an apparatus equipped with conventional perforated plate (effective area 48 percent) at a distance of 50 cm., and by making the feed of NaCl solution and the feed of resin the same as above, 5 m./hr. of ascending linear velocity is maximum and regeneration is maximum at from Ca 0.30 meq./R-Na$^{cc.}$ of the incoming resin absorbed amount to 0.08 meq./R-Na$^{cc.}$ of the outgoing resin when the ascending linear velocity is 5 m./hr. and tower height is 8 m. Value of "meq./R-Na$^{cc.}$" indicates milliequivalent per cc. of Na form resin.

*Example 2*

The 1 N-HCl solution, which accompanies strongly acidic ion exchange resin (Diaion SKIA, a commercial name) rendered H type with regeneration by 1 N-HCl, is water-washed in the present apparatus. This apparatus has a square cross section of 0.09 ms.$^2$. The rectifying plates have a 35% hole area and the diameters of the holes are 8 mm. The passage for the granular material is 3 cm. wide and the distance between each rectifying plate is 50 cm. The tower height is 3 m. The operation was performed at 20° C. The resin was allowed to descend at 500 lit./hr.; the results of washing with water at 1,500 lit./hr. (washing ratio 3) were:

Initial solution, HCl 1.00 N.
Solution accompanying resin withdrawn from bottom of tower, HCl 0.003 N.

When the same operation was conducted with a washing tower having a cross section of 0.10 m.$^2$ and conventional perforated plates (hole area 48%, hole diameter 8 mm.), the results were as given below upon treating with 270 lit./hr. of resin and 810 lit./hr. of water:

Initial solution, HCl 1.00 N.
Solution accompanying resin withdrawn from bottom of tower, HCl 0.012 N.

Thus a significant difference is seen in both the treating capacity and washing efficiency.

What we claim is:

1. A method of effecting contact between granular material and a liquid, said method comprising downwardly passing by the action of gravity granular material along a pair of perforated plates which are spaced apart and inclined with respect to the horizontal to define a V-shape narrowing downwardly, upwardly passing liquid through the perforations of the plates to contact and mix with the downflowing granular material, discharging the granular material from the inclined plates after contact of the material with the liquid through a continuous vertical passageway between the plates which has the same horizontal length as the plates and which has a rectangular cross-section in a horizontal plane, the liquid being discharged from the plates by continued upward travel whereby the liquid passes substantially only through the perforations and countercurrent contact is effected substantially only on the plates.

2. Continuous countercurrent apparatus for contacting granular material with liquid, said apparatus comprising a pair of perforated plates extending adjacent one another and inclined with respect to the horizontal to define a V-shape which narrows downwardly, said plates including depending ends which extend parallel to one another along the entire horizontal length of the inclined portions to define therebetween a vertical passageway for the downward flow of granular material, said passageway having a rectangular cross-section in a horizontal plane, the perforations of said plates enabling upward passage for the flow of liquid.

3. Apparatus as claimed in claim 2 comprising a plurality of said pairs of plates arranged in vertically superposed steps, the plates in adjacent steps extending in horizontal directions which are mutually perpendicular.

References Cited by the Examiner

UNITED STATES PATENTS

| | | | |
|---|---|---|---|
| 2,376,564 | 5/1945 | Upham et al. | 23—288 X |
| 2,460,151 | 1/1949 | Sinclair | 23—288 |
| 2,519,150 | 8/1950 | Ostergaard | 23—288 X |
| 2,541,801 | 2/1951 | Wilcox | 23—288 X |
| 2,606,104 | 8/1952 | Hogan et al. | 23—288 X |
| 2,893,849 | 7/1959 | Krebs | 23—288 X |
| 3,052,990 | 9/1962 | Tailor | 23—283 X |
| 3,099,538 | 7/1963 | Kronig et al. | 23—288 |

MORRIS O. WOLK, *Primary Examiner.*

J. SCOVRONEK, *Assistant Examiner.*